US008595451B2

(12) United States Patent
McKean et al.

(10) Patent No.: US 8,595,451 B2
(45) Date of Patent: Nov. 26, 2013

(54) MANAGING A STORAGE CACHE UTILIZING EXTERNALLY ASSIGNED CACHE PRIORITY TAGS

(75) Inventors: Brian McKean, Longmont, CO (US); Mark Ish, Sandy Springs, GA (US)

(73) Assignee: LSI Corporation, San Jose, CA (US)

( * ) Notice: Subject to any disclaimer, the term of this patent is extended or adjusted under 35 U.S.C. 154(b) by 217 days.

(21) Appl. No.: 12/939,863

(22) Filed: Nov. 4, 2010

(65) Prior Publication Data

US 2012/0117328 A1 May 10, 2012

(51) Int. Cl.
G06F 13/00 (2006.01)
G06F 12/08 (2006.01)
G06F 3/06 (2006.01)

(52) U.S. Cl.
USPC .................. 711/158; 711/138; 711/E12.021; 711/E12.022

(58) Field of Classification Search
None
See application file for complete search history.

(56) References Cited

U.S. PATENT DOCUMENTS

| | | | | |
|---|---|---|---|---|
| 5,765,204 A | * | 6/1998 | Bakke et al. | 711/202 |
| 6,324,620 B1 | * | 11/2001 | Christenson et al. | 711/112 |
| 6,865,648 B1 | * | 3/2005 | Naamad et al. | 711/133 |
| 7,089,357 B1 | * | 8/2006 | Ezra | 711/144 |
| 7,103,735 B2 | | 9/2006 | Iyer | |
| 7,225,211 B1 | * | 5/2007 | Colgrove et al. | 707/693 |
| 7,437,515 B1 | * | 10/2008 | Naamad et al. | 711/154 |
| 2003/0004920 A1 | * | 1/2003 | Coverston et al. | 707/1 |
| 2006/0161678 A1 | * | 7/2006 | Bopardikar et al. | 709/238 |
| 2006/0165040 A1 | * | 7/2006 | Rathod et al. | 370/335 |
| 2007/0115151 A1 | * | 5/2007 | Singh | 341/50 |
| 2007/0266037 A1 | * | 11/2007 | Terry et al. | 707/100 |
| 2008/0040554 A1 | | 2/2008 | Zhao et al. | |
| 2008/0086599 A1 | | 4/2008 | Maron et al. | |
| 2012/0102270 A1 | * | 4/2012 | Chishti et al. | 711/118 |

OTHER PUBLICATIONS

Ramachandran et al. "Packets with Provenance." Georgia Institute of Technology SCS Technical Reports, 2008.*
Carl Henrik Lunde. "Improving Disk I/O on Linux." University of Oslo Department of Informatics, May 2009.*

* cited by examiner

*Primary Examiner* — Jasmine Song
*Assistant Examiner* — Daniel Bernard
(74) *Attorney, Agent, or Firm* — Suiter Swantz pc llo

(57) ABSTRACT

A method for caching data in a storage medium implementing tiered data structures may include storing a first portion of critical data at the instruction of a storage control module. The first portion of critical data may be separated into data having different priority levels based upon at least one data utilization characteristic associated with a file system implemented by the storage control module. The method may also include storing a second portion of data at the instruction of the storage control module. The second storage medium may have at least one performance, reliability, or security characteristic different from the first storage medium.

18 Claims, 4 Drawing Sheets

MANAGING A STORAGE CACHE UTILIZING EXTERNALLY ASSIGNED CACHE PRIORITY TAGS

TECHNICAL FIELD

The present disclosure generally relates to the field of computing systems and more particularly to a device, method, and system for caching data in a storage medium implementing tiered data structures.

BACKGROUND

A storage system may utilize a cache to perform several functions. These functions may include retaining frequently accessed data for reuse, storing data that has been speculatively pre-fetched, and optimizing writes to media by buffering written data. One challenge a storage system may have is selecting which data to cache. Additionally, if the storage system needs to recycle cache space, the storage system must select which cache data to remove from the cache.

One technique a storage system may utilize is to employ a Least Recently Used (LRU) tracking list to decide which cache blocks should remain in the cache, and which cache blocks should be recovered when additional cache space is needed. Thus, when cache space is needed, the least recently used cache blocks are recycled and freed for reuse by the storage system.

SUMMARY

A device for caching data in a storage medium implementing tiered data structures may include a storage control module for storing a first portion of critical data and a second portion of data at the instruction of an operating system. The device may also include a first storage medium coupled with the storage control module for storing the first portion of critical data. The first portion of critical data may be separated into data having different priority levels based upon at least one data utilization characteristic associated with a file system implemented by the storage control module. The device may also include a second storage medium coupled with the storage control module for storing the second portion of data. The second storage medium may have at least one performance, reliability, or security characteristic different from the first storage medium.

A method for caching data in a storage medium implementing tiered data structures may include storing a first portion of critical data at the instruction of a storage control module. The first portion of critical data may be separated into data having different priority levels based upon at least one data utilization characteristic associated with a file system implemented by the storage control module. The method may also include storing a second portion of data at the instruction of the storage control module. The second storage medium may have at least one performance, reliability, or security characteristic different from the first storage medium.

A system for caching data in a storage medium implementing tiered data structures may include a storage network for coupling with the application server. The storage network may include a storage control module for storing a first portion of critical data and a second portion of data at the instruction of an operating system. The storage network may also include a first storage medium coupled with the storage control module for storing the first portion of critical data. The first portion of critical data may be separated into data having different priority levels based upon at least one data utilization characteristic associated with a file system implemented by the storage control module. The storage network may further include a second storage medium coupled with the storage control module for storing the second portion of data. The second storage medium may have at least one performance, reliability, or security characteristic different from the first storage medium.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
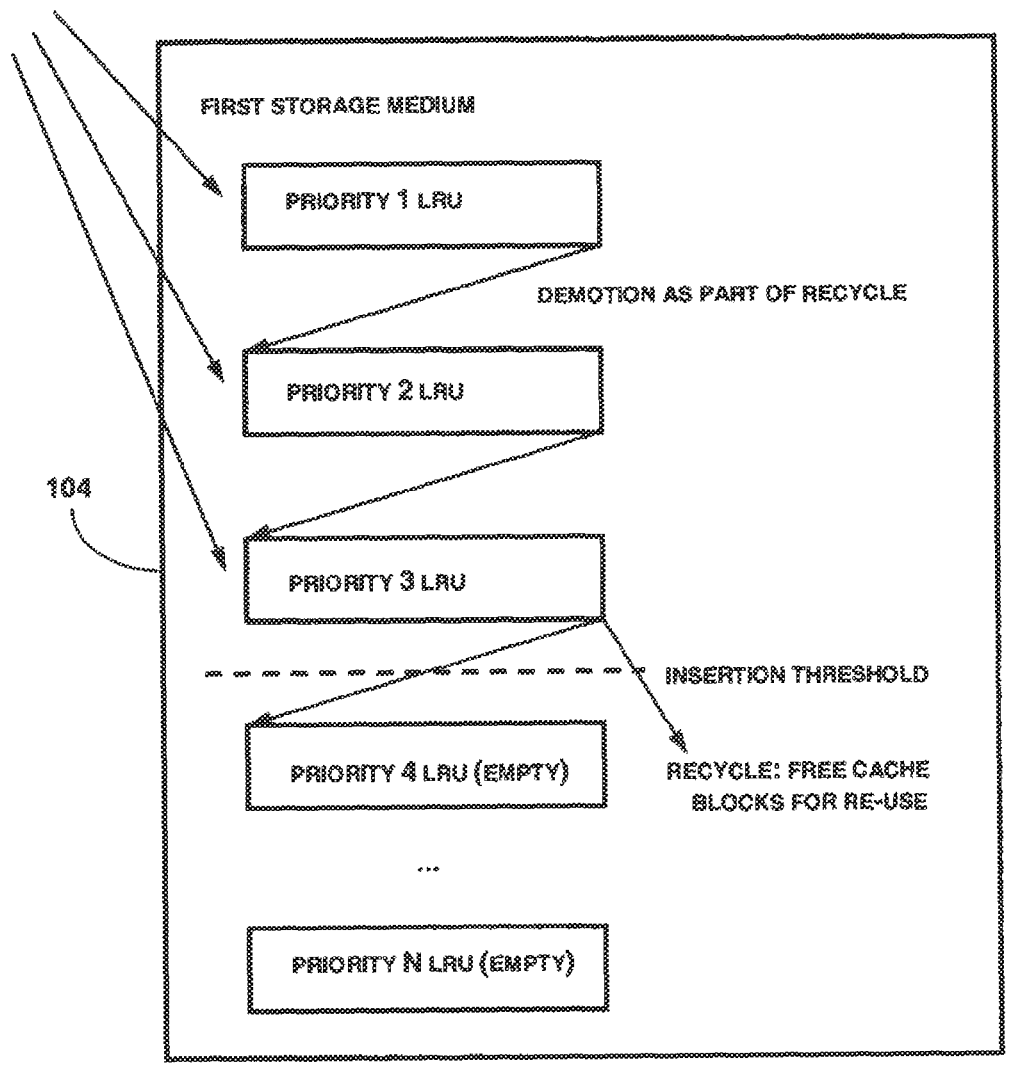
FIG. 1 is a schematic illustrating a storage medium implementing tiered data structures for caching data having externally assigned cache priority tags.

Reference will now be made in detail to the subject matter disclosed, which is illustrated in the accompanying drawings.

Referring generally to FIGS. 1 through 5, a storage system 100 is described in accordance with the present disclosure. The storage system 100 may be included with an information handling system. In embodiments, the information handling system may include an application server (e.g., a specialized server in a client/server network for executing specific applications within that network, a Central Processing Unit (CPU) included with a personal computer, or the like). The application server may be configured for executing control programming for an operating system and a software application hosted by the operating system. In embodiments, the operating system may be implemented as an interface between computer hardware and one or more users. For example, the operating system may be responsible for managing and coordinating activities and resource sharing on a computer. Thus, the operating system may act as a host for one or more computing applications executed on the computer, such as the software application.

The application server may be coupled with the storage system 100 for storing and/or retrieving data. For instance, the storage system 100 includes a storage control module 102 for controlling the storage and/or retrieval of data for the application server. The storage control module 102 is coupled with a first storage medium 104 (e.g., a non-volatile flash memory storage medium such as a Solid State Drive (SSD), a Peripheral Component Interconnect Express (PCIe) card, a high performance Hard Disk Drive (HDD), or the like) for storing data at the instruction of the operating system. In embodiments, the first storage medium 104 may include a Redundant Array of Independent Disks (RAID) storage array, such as an array including the first SSD and a second SSD (and possibly additional drives as well). In one example configuration, the RAID storage array may be arranged in a RAID 1 configuration for implementing data mirroring. In other configurations, the RAID storage array may implement other RAID storage techniques, including striping, parity bits, and the like.

The storage control module 102 is also coupled with a second storage medium 106 (e.g., a HDD, or the like) for storing data at the instruction of the operating system. In embodiments, the second storage medium 106 may include a second RAID storage array, such as an array including the first HDD and a second HDD (and possibly additional drives as well). The second RAID storage array may be arranged in a RAID 1 configuration, as previously described. In other configurations, the second RAID storage array may implement other RAID storage techniques, including striping, parity bits, and the like.

The second storage medium 106 has at least one performance, reliability, or security characteristic different from the first storage medium 104. For example, the first SSD/first RAID storage array may have a lower latency than the first HDD/second RAID storage array for more quickly serving data storage and/or retrieval requests from the application server. Alternatively, the first SSD/first RAID storage array may have a higher reliability than the first HDD/second RAID storage array. Further, the first SSD/first RAID storage array may provide a greater amount of security than the first HDD/second RAID storage array. For example, the first SSD/first RAID storage array may store data in a scrambled/encrypted format, or the like (while the first HDD/second RAID storage array may store data in an unencrypted format). It should be noted that while the first SSD, the second SSD, the first RAID storage array, the first HDD, the second HDD, and the second RAID storage array have been described with some specificity, the first storage medium 104 and/or the second storage medium 106 may include other types of storage media coupled with the storage control module 102, including storage media having alternative physical and/or logical characteristics.

In embodiments, the storage control module 102 may include a disk array controller 108 for managing the first SSD/first RAID storage array and/or the first HDD/second RAID storage array. Utilizing the disk array controller 108, the storage control module 102 may present the first SSD/first RAID storage array and/or the first HDD/second RAID storage array to the application server as one or more logical units. Further, the disk array controller 108 may control the first SSD/first RAID storage array for transparently storing certain portions of data so that future requests for that data can be served faster.

In an example implementation, a first portion of critical data utilized by the software application and/or the operating system may be stored in the first storage medium 104. In embodiments, critical data includes performance sensitive data (e.g., frequently accessed data) that would benefit from selective storage in higher performance media. A second portion of data may be stored in the second storage medium 106. In some embodiments, the second portion of data may be separate from the first portion of critical data. Alternatively, the second portion of data may include at least a part of the first portion of critical data. For example, the first portion of critical data may be stored in the second storage medium 106 along with the second portion of data.

In some implementations, a write to a critical data block can go to the first storage medium 104 first and then to the second storage medium 106 at a later time when system performance may be less impacted. In either case, the storage control module 102 may present the internal data blocks stored in the first storage medium 104 and/or the second storage medium 106 to the application server as a logical construct, where an external view of the data blocks may include a logical arrangement of the data blocks as one contiguous memory space. However, this implementation is provided by way of example only and is not meant to be limiting of the present disclosure. Thus, other logical arrangements presenting different external views of the data may also be utilized.

In embodiments, the first critical portion of data for the software application may be identified by the operating system. In one example implementation, the operating system assigns importance levels to data by identifying critical data according to the frequency of data accesses (e.g., utilizing a Least Recently Used (LRU) priority scheme). In another example implementation, the operating system identifies critical data based on the latency of secondary storage (e.g., in a case where the second storage medium 106 includes various storage media with different access times).

In example implementations, the lower latency of the first SSD/first RAID storage array may allow for faster access to data stored in the first storage medium 104. Thus, the first portion of critical data assigned the first importance level by the operating system may be more efficiently stored and/or retrieved. In one example configuration, the first portion of critical data may be stored and/or retrieved directly in the first SSD/first RAID storage array. In another example configuration, the first portion of critical data may first be pre-loaded from the first HDD/second RAID storage array into the first SSD/first RAID storage array prior to retrieval by the operating system.

In other implementations, the operating system may assign importance levels to data by identifying critical data according to its data type. For instance, in one specific embodiment, sequential data included with a video file may be identified as critical data when that data will be frequently accessed. In another implementation, sequential data may be excluded from the first/critical portion of data when that data will be infrequently accessed. In further implementations, the operating system may identify critical data according to how frequently that data may require modification. For example, in a case where the first storage medium includes Multi-Level Cell (MLC) flash memory (or another type of memory having high read speeds but a shorter life in the presence of writes), frequently accessed read intensive data which is infrequently modified may be identified as critical data, while frequently accessed data which is also frequently modified may be excluded from the first/critical portion of data.

In embodiments, data for the software application and/or the operating system stored in the first storage medium 104 and/or the second storage medium 106 may be loaded into a memory space of the information handling system. For example, the operating system may store and/or retrieve data in the main memory of the information handling system. Periodically, this data may then be stored and/or retrieved in secondary storage including the first storage medium 104 and/or the second storage medium 106.

In some embodiments, the memory space of the information handling system may include a Dynamic Random Access Memory (DRAM) cache. The DRAM cache may further improve access times for data utilized by the software application and/or the operating system. For example, the storage control module 102 may include a cache controller, which may be implemented as a circuit controlling an interface between the application server and the DRAM cache. The cache controller may control the DRAM cache for transparently storing data so that future requests for that data can be served faster.

In some embodiments, the DRAM cache may be implemented as part of the main memory of the information handling system, while in other embodiments, the DRAM cache may be implemented as another type of cache memory. For example, the DRAM cache may be physically and/or logically separate from the main memory. It should be noted that while the DRAM cache has been described with some specificity, other types of cache memory may be coupled with the application server, including memory having alternative physical and/or logical characteristics.

In some implementations, the information handling system may be implemented as a personal device, such as a desktop computer, a laptop computer, a personal digital assistant, a mobile communications device (e.g., a cellular telephone), an internet tablet, or another type of stand alone device. In other implementations, the information handling system may be implemented as a computer server and/or a terminal connected to a storage network, such as a Storage Area Network (SAN), or the like. In still further embodiments, the information handling system may be implemented as a cloud computing arrangement utilizing multiple Internet terminals/stations, where one or more of the terminals/stations are coupled with network storage. It will be appreciated that the information handling system may be implemented in many other various configurations as well.

The first portion of critical data stored in the first storage medium 104 is separated into data having different priority levels based upon at least one data utilization characteristic. For example, as illustrated in FIG. 1, data in the first storage medium 104 may be separated into multiple level/tiered data structures. A separate data structure may be created for each group of data having an assigned cache priority tag indicating a given priority level, where each priority level is managed by the storage control module 102. In some embodiments, each priority level in the cache may be implemented as an LRU queue. Cache blocks associated with lower priority data may bypass the priority queue and move directly to the free list once an associated Input/Output (I/O) process is completed. Further, an aging mechanism may be implemented to move higher priority cache blocks to lower priority data structures when they are not referenced for some time. By structuring the cache in this way, higher priority data may be retained in the cache longer than lower priority data.

In one implementation, initially (e.g., upon booting an information handling system) all cache blocks in the first storage medium 104 may be included with a free list, and the various data structure lists may be empty. As each I/O process utilizes cache blocks, each cache block is placed into a priority queue (e.g., an LRU queue that matches the I/O process priority). Once all available cache blocks in the tiered data structures have been utilized, a recycle process may commence. In embodiments, the recycle process may involve removing one or more cache blocks from the lowest priority data structure/queue and adding them to a free list for utilization by subsequent I/O processes.

Also, as part of the recycle process, the least recently used cache blocks in each priority queue may be demoted and moved to a lower priority data structure. For example, as least recently used cache blocks are demoted, they may be moved to the head of the next lower priority LRU queue. Further, an insertion threshold may be set below the lowest priority LRU that is not empty. Then, any subsequent cache blocks resulting from an I/O process of a lower priority may be moved directly to the free block space and not entered into a queue. When the demotion process of a subsequent recycle operation causes additions to an empty queue below the insertion threshold, the insertion threshold may be moved down by a priority level.

Figure 2:
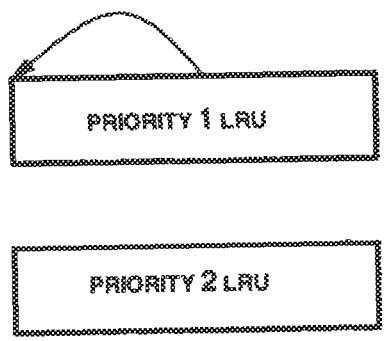
FIG. 2 is a schematic illustrating a technique for managing priority tagged data in tiered data structures in the case of a cache hit.
Figure 3:
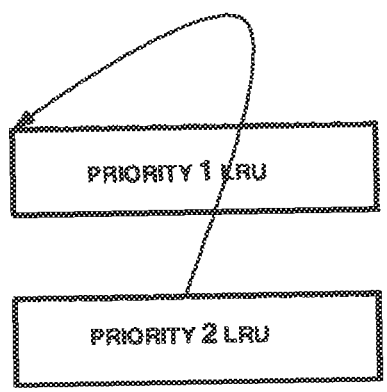
FIG. 3 is a schematic illustrating another technique for managing priority tagged data in tiered data structures in the case of a different type of cache hit.
Figure 4:
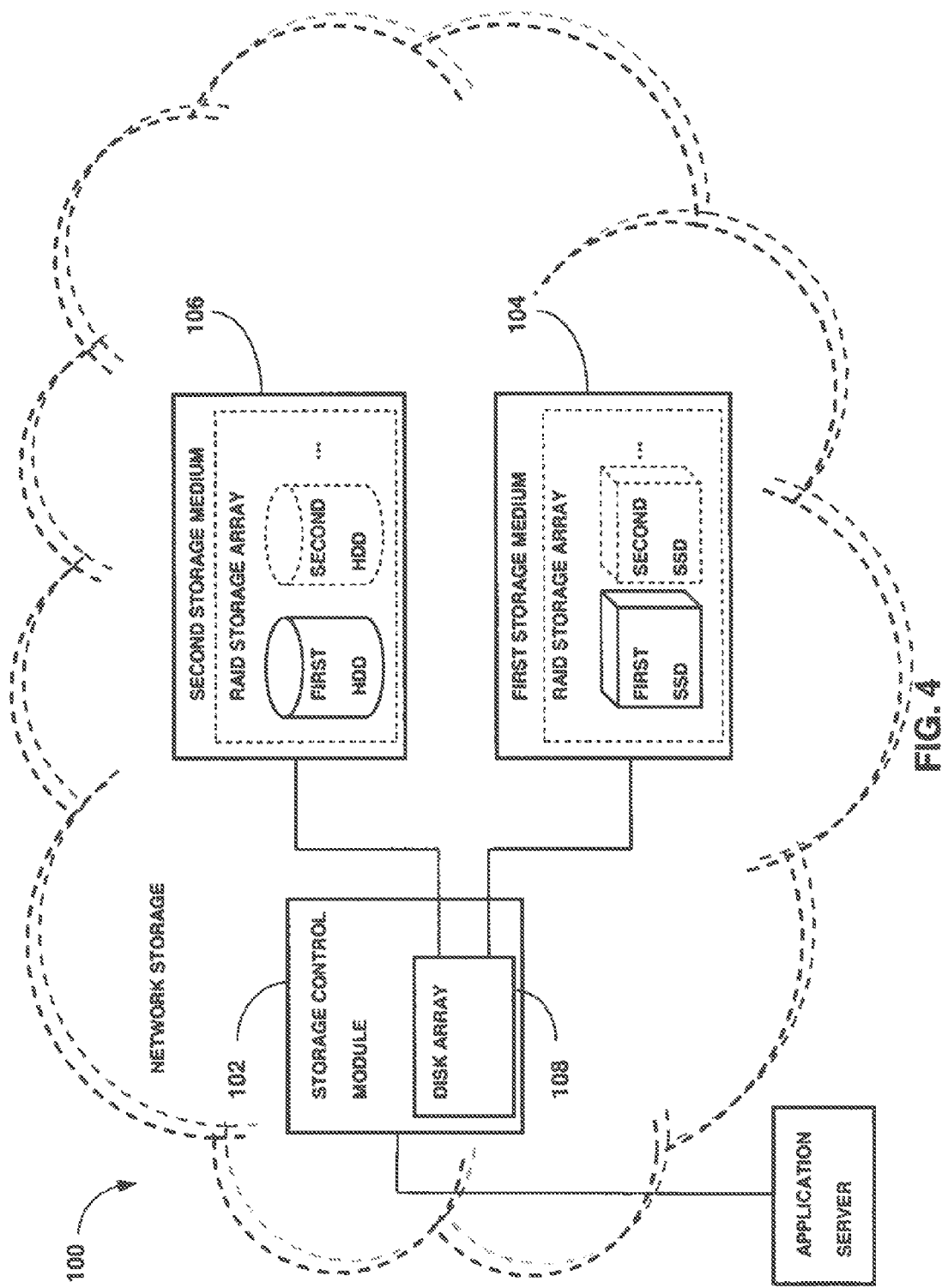
FIG. 4 is a schematic illustrating an information handling system for caching data in a storage medium implementing tiered data structures.

Referring now to FIGS. 2 and 3, a mechanism for managing data in the first storage medium 104 is described. As illustrated in FIG. 2, when a cache block resides in a data structure having the same priority level as the cache block, the cache block may be moved to the head of that queue. Alternatively, when an I/O process causing a cache hit indicates a differing priority level from the queue tracking the cache block, the cache block may be moved to the head of the data structure matching the priority of the cache block. For example, as illustrated in FIG. 3, a cache block in the priority 2 queue experiences a cache hit during an I/O process indicating an assigned tag of priority level 1. This may cause the cache block to move to the head of the priority level 1 queue. It should be noted that the mismatch in priority described in FIG. 3 may occur due to demotion during a recycle process. Alternatively, the mismatch in priority may occur with changes in priority levels indicated between subsequent I/O processes.

In embodiments, the first portion of critical data stored in the first storage medium 104 is separated into data having different priority levels based upon at least one data utilization characteristic associated with a file system implemented by the storage control module. For example, data such as metadata associated with a file directory (e.g., a pointer indicating the beginning of a location of one or more data blocks/sectors that store the actual contents of a file) may be assigned a higher priority than data associated with the actual contents of the file. In other implementations, metadata associated with a time when a file was last updated may be assigned a higher priority than the actual contents of a file. Further, the metadata itself may be separated into different priority levels. For instance, data regarding the location of a file, e.g., a Logical Block Address (LBA), or the like, may be assigned a higher priority than data referring to when the file was last modified.

It will be appreciated that while metadata has been described with some specificity as one way to differentiate data, other types of data utilization characteristics associated with a file system may be utilized to assign priority tags to various other types of data blocks. For instance, in embodiments, data representing the archived contents of a mail server file may be assigned a lower priority than data representing frequently accessed entries in a database, such as registry values stored by an operating system.

Figure 5:
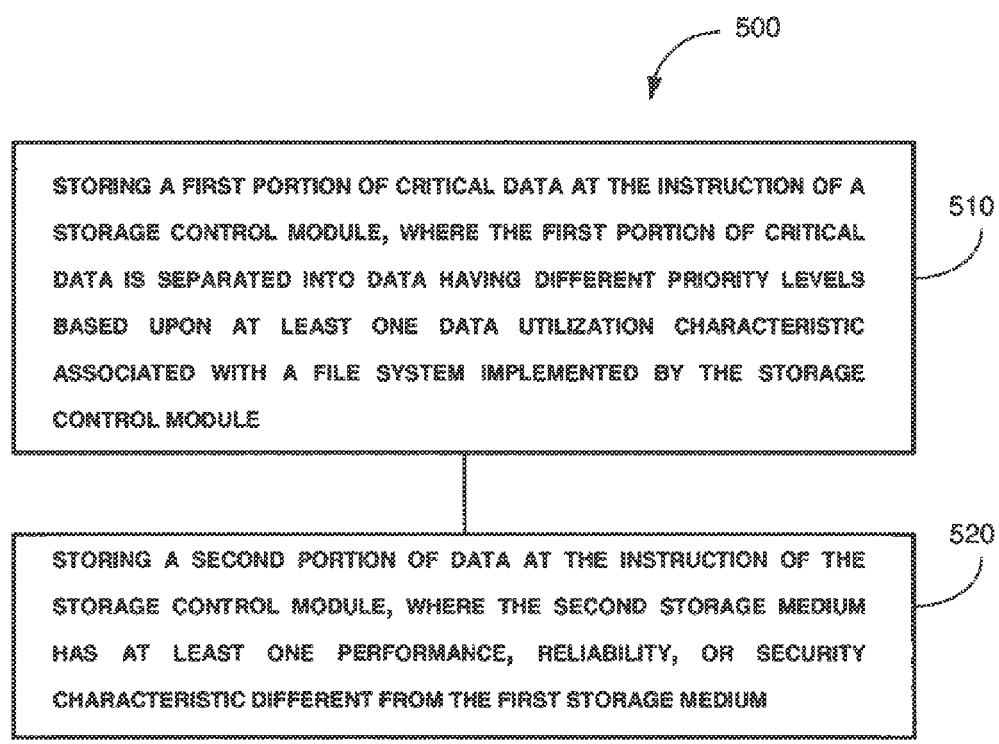
FIG. 5 is a flow diagram illustrating a method for caching data in a storage medium implementing tiered data structures.

Referring now to FIG. 5, a method 500 for caching data in a storage medium implementing tiered data structures may include storing a first portion of critical data at the instruction of a storage control module, 510. The first portion of critical data may be separated into data having different priority levels based upon at least one data utilization characteristic associated with a file system implemented by the storage control module, as previously described. The method 500 may also include storing a second portion of data at the instruction of the storage control module, 520. The second storage medium may have at least one performance, reliability, or security characteristic different from the first storage medium, as previously described.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
a storage control module of a storage system for storing a first portion of critical data and a second portion of critical data at an instruction of an operating system, wherein the storage control module is configured to communicatively couple at least to a first storage medium, a second storage medium, and an information handling device, the storage control module configured for managing cache data of the storage system;
the first storage medium for storing the first portion of critical data, where the first portion of critical data is separated into data having different priority levels based upon at least one data utilization characteristic associated with a file system implemented by the storage control module, wherein the first storage medium comprises a cache storage medium including a plurality of least recently used (LRU) data structures and a list of free cache blocks, the plurality of LRU data structures at least including a first LRU data structure and a second LRU data structure, wherein each of the plurality of LRU data structures corresponds to a particular priority level of a plurality of priority levels; and
the second storage medium coupled with the storage control module for storing the second portion of critical data, wherein the second storage medium has at least one characteristic of performance, reliability, or security, different from the first storage medium,
wherein the storage control module is further configured for:
receiving an instruction to store or access data of the storage system, the data being associated with a particular input/output (I/O) process of the information handling device; and
caching at least a portion of the data in a particular least recently used data structure of the first storage medium based upon an externally assigned priority level of the particular I/O process and the priority level of the particular least recently used data structure of the first storage medium, and
wherein the externally assigned priority level of the particular I/O process is assigned by a second operating system, of the information handling device, based upon a data utilization characteristic.

2. The system of claim 1, wherein the plurality of LRU data structures are configured to place data in the first storage medium and the second storage medium according to a relative performance, reliability, or security characteristics of the first storage medium and the second storage medium such that the first storage medium is first populated with data referenced by relatively higher priority LRU data structures.

3. The system of claim 1, wherein a higher priority cache block is moved to a lower priority LRU data structure when the cache block is not referenced for a period of time.

4. The system of claim 1, wherein a least recently used data block of the first LRU data structure is demoted to the second LRU data structure, the second LRU data structure having a lower priority than the first LRU data structure.

5. The system of claim 1, wherein the first storage medium is logically configured to provide an insertion threshold set below the lowest utilized priority level in the first storage medium.

6. The system of claim 1, wherein a data block associated with a cache hit in a first data structure is promoted to a second data structure having a higher priority than the first data structure when a priority associated with the cache hit is greater than the priority of the first data structure.

7. The system of claim 1, wherein the data utilization characteristic associated with a file system implemented by the storage control module includes at least one of a designation of metadata associated with the file system or the actual contents of a file.

8. A system, comprising:
a storage control module of a storage system, the storage control module configured to communicatively couple at least to a first storage medium, a second storage medium, and an information handling device, the storage control module configured for managing cache data of the storage system; and
the first storage medium comprising a cache storage medium including a plurality of least recently used data structures and a list of free cache blocks, each of the plurality of least recently used data structures corresponding to a particular priority level of a plurality of priority levels,
wherein the storage control module is further configured for:
receiving an instruction to store or access data of the storage system, the data being associated with a particular input/output (I/O) process of the information handling device; and
caching at least a portion of the data in a particular least recently used data structure of the first storage medium based upon an externally assigned priority level of the particular I/O process and the priority level of the particular least recently used data structure of the first storage medium, and
wherein the externally assigned priority level of the particular I/O process is assigned by an operating system of the information handling device based upon a data utilization characteristic.

9. The system of claim 8, wherein the first storage medium is configured for:
storing the first portion of critical data, wherein the first portion of critical data is separated into data having different priority levels based upon at least one data utilization characteristic associated with a file system implemented by the storage control module.

10. The system of claim 8, wherein the second storage medium is configured for:
storing the second portion of critical data, wherein the second storage medium has at least one characteristic of performance, reliability, or security, different from the first storage medium.

11. The system of claim 8, wherein the storage control module includes a cache controller, the cache controller being implemented as a circuit.

12. The system of claim 8, wherein the storage control module is further configured for:
   removing one or more cache blocks from a lowest priority least recently used data structure of the plurality of least recently used data structures of the cache storage medium; and
   adding the one or more removed cache blocks to the list of free cache blocks of the cache storage medium for use by subsequent I/O processes.

13. The system of claim 12, wherein the storage control module is further configured for:
   demoting a least recently used cache block of a particular least recently used data structure of the plurality of least recently used data structures to a lower particular least recently used data structure having a lower priority level.

14. The system of claim 8, wherein the storage control module is further configured for:
   determining for a particular cache hit of a plurality of cache hits whether a priority mismatch between the externally assigned priority level of the particular I/O process and a priority level of a particular cache block of the particular least recently used data structure associated with the particular I/O process has occurred.

15. The system of claim 14, wherein the storage control module is further configured for:
   promoting the particular cache block to the head of a least recently used data structure having a same priority level as the priority level of the particular I/O process upon determining the occurrence of the priority mismatch between the externally assigned priority level of the particular I/O process and the priority level of the particular cache block.

16. The system of claim 14, wherein the storage control module is further configured for:
   moving the particular cache block to the head of the particular cache block's least recently used data structure having a same priority level as the particular I/O process upon determining the occurrence of a priority match between the externally assigned priority level of the particular I/O process and the priority level of the particular cache block.

17. The system of claim 14, wherein the storage control module is further configured for:
   determining whether the particular I/O process of the information handling device has a priority level less than a lowest priority least recently used data structure of the first storage medium upon receiving the instruction to store the data in the storage system, the data being associated with the particular input/output (I/O) process of the information handling device.

18. A system, comprising:
   a storage control module of a storage system, the storage control module configured to communicatively couple at least to a first storage medium, a second storage medium, and an information handling device, the storage control module configured for managing cache data of the storage system;
   the first storage medium being configured for storing the first portion of critical data, wherein the first portion of critical data is separated into data having different priority levels based upon at least one data utilization characteristic associated with a file system implemented by the storage control module, the first storage medium comprising a cache storage medium including a plurality of least recently used data structures and a list of free cache blocks, each of the plurality of least recently used data structures corresponding to a particular priority level of a plurality of priority levels;
   the second storage medium, the second storage medium being configured for storing the second portion of data, wherein the second storage medium has at least one characteristic of performance, reliability, or security, different from the first storage medium; and
   wherein the storage control module is further configured for:
      receiving an instruction to store or access data of the storage system, the data being associated with a particular input/output (I/O) process of the information handling device; and
      caching at least a portion of the data in a particular least recently used data structure of the first storage medium based upon the externally assigned priority level of the particular I/O process and the priority level of the particular least recently used data structure of the first storage medium.

* * * * *